(12) United States Patent
Kumar et al.

(10) Patent No.: US 11,461,953 B2
(45) Date of Patent: Oct. 4, 2022

(54) METHOD AND DEVICE FOR RENDERING OBJECT DETECTION GRAPHICS ON IMAGE FRAMES

(71) Applicant: Wipro Limited, Bangalore (IN)

(72) Inventors: Kodavalla Vijay Kumar, Bangalore (IN); Venumadhav Chittapragada Hanumantharao, Bangalore (IN)

(73) Assignee: Wipro Limited, Bangalore (IN)

( * ) Notice: Subject to any disclaimer, the term of this patent is extended or adjusted under 35 U.S.C. 154(b) by 9 days.

(21) Appl. No.: 16/794,394

(22) Filed: Feb. 19, 2020

(65) Prior Publication Data

US 2021/0201555 A1 Jul. 1, 2021

(30) Foreign Application Priority Data

Dec. 27, 2019 (IN) .............................. 201941054203

(51) Int. Cl.
| | |
|---|---|
| *G06T 11/00* | (2006.01) |
| *G06T 15/00* | (2011.01) |
| *G06T 1/20* | (2006.01) |
| *G06T 1/60* | (2006.01) |
| *G06T 15/50* | (2011.01) |

(52) U.S. Cl.
CPC .............. *G06T 15/005* (2013.01); *G06T 1/20* (2013.01); *G06T 1/60* (2013.01); *G06T 11/001* (2013.01); *G06T 15/503* (2013.01); *G06T 2210/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,762,644 | B1* | 9/2020 | Mahadevan | ........... G06N 3/084 |
| 11,257,132 | B1* | 2/2022 | Cornelison | ............... G06T 7/13 |
| 2005/0190197 | A1* | 9/2005 | Ebi | ......................... G09G 5/06 |
| | | | | 345/589 |
| 2012/0293558 | A1* | 11/2012 | Dilts | ....................... G06T 11/80 |
| | | | | 345/676 |
| 2016/0225157 | A1* | 8/2016 | Yuan | ...................... G06T 15/005 |
| 2017/0161911 | A1* | 6/2017 | Kumar | ................. G06K 9/4628 |
| 2018/0121762 | A1* | 5/2018 | Han | ...................... G06K 9/4671 |

(Continued)

FOREIGN PATENT DOCUMENTS

WO 2010070567 A1 6/2010

*Primary Examiner* — Andrew G Yang
(74) *Attorney, Agent, or Firm* — Finnegan, Henderson, Farabow, Garrett & Dunner, LLP

(57) ABSTRACT

A method and system for rendering object detection graphics on image frames is disclosed. The method includes receiving an object detection information for an image frame. The object detection information includes bounding box data and a class label data associated with an object in the image frame. The method further includes determining a first value for each pixel in a first set of pixels associated with a bounding box for the object and determining a second value for each pixel in a second set of pixels associated with a class label for the object. The method includes modifying values for each of the first set of pixels based on the associated first value to render the bounding box on the image frame and modifying values for each of the second set of pixels based on the associated second value to render the class label on the image frame.

19 Claims, 11 Drawing Sheets

(56) References Cited

U.S. PATENT DOCUMENTS

| | | | |
|---|---|---|---|
| 2019/0102646 A1* | 4/2019 | Redmon | G06K 9/4652 |
| 2019/0258888 A1* | 8/2019 | Garrido | G06K 9/348 |
| 2019/0325243 A1* | 10/2019 | Sikka | G06K 9/46 |
| 2020/0160070 A1* | 5/2020 | Sholingar | G06N 3/084 |
| 2020/0174937 A1* | 6/2020 | Yao | H04L 9/3239 |
| 2020/0175384 A1* | 6/2020 | Zhang | G06N 3/0454 |
| 2020/0250453 A1* | 8/2020 | Gupta | G06F 3/0482 |
| 2020/0311920 A1* | 10/2020 | Gunji | G06K 9/6263 |
| 2020/0394824 A1* | 12/2020 | Kanzawa | G06T 11/001 |
| 2020/0409830 A1* | 12/2020 | Li | G06F 11/3664 |
| 2021/0027471 A1* | 1/2021 | Cohen | G06K 9/4652 |
| 2021/0049828 A1* | 2/2021 | Park | G06T 7/11 |

* cited by examiner

METHOD AND DEVICE FOR RENDERING OBJECT DETECTION GRAPHICS ON IMAGE FRAMES

TECHNICAL FIELD

This disclosure relates generally to detection of objects from image frames, and more particularly to method and system for rendering object detection graphics on image frames.

BACKGROUND

In conventional vision based object detection methods and systems, an image processor processes input image frames along with detected object and prepares associated graphics-frames corresponding to the input image frames. The image processor then stores the input image frames and the associated graphics frames in a frame buffer. A display processor may then read the stored input image frames and the graphics frames from the frame buffer and may subsequently render these image frames through a display device as a combined image frame. This leads to a delay in rendering an image along with graphical indication of detected objects, as multiple steps that include preparing a graphics frame for an input image frame, storing it in the frame buffer along with the image frame, reading the graphics frame along with the graphics frame from the frame buffer, overlaying the graphics image over the input image frame, and finally rendering it as a combined image frame, are involved.

As a result of multitude of intermediate steps, higher latency is introduced between an incoming image frame and a rendered output image frame on a display. Therefore, conventional vision based object detection methods and systems are not desirable for latency sensitive systems, which may include autonomous vehicles, Close Circuit Television (CCTV) cameras, and certain medical device. More specifically, in the context of fast moving interactive video content, where a user is required to act on an object of interest, higher latency and lower throughput of these conventional systems and methods may cause a user to miss the required action on time.

Further, these conventional methods and systems also have a reduced overall performance in terms of number of image frames that can be processed per second.

SUMMARY

In one embodiment, a method for rendering object detection graphics on a plurality of image frames is disclosed. In one embodiment, the method may include receiving an object detection information for an image frame within the plurality of image frames. The image frame includes a plurality of objects and the object detection information includes plurality of bounding boxes data and plurality of class labels data associated with the objects. The method may further include determining each of a first value for each pixel in a first set of pixels associated with a bounding box for the object within the image frame, based on the bounding box data and the class label data. The method may further include determining each of a second value for each pixel in a second set of pixels associated with a class label for the object within the image frame, based on the class label data. The method may further include modifying each of values for each of the first set of pixels based on the associated first value to render the bounding box on the image frame. The method may further include modifying each of values for each of the second set of pixels based on the associated second value to render the class label on the image frame.

In another embodiment, a system for rendering object detection graphics on a plurality of image frames is disclosed. The system includes a processor and a memory communicatively coupled to the processor, wherein the memory stores processor instructions, which, on execution, causes the processor to receive an object detection information for an image frame within the plurality of image frames, wherein the image frame comprises plurality of objects and the object detection information comprises plurality of bounding boxes data and plurality of class labels data associated with the objects. The processor instructions further cause the processor to determine each of a first value for each pixel in a first set of pixels associated with a bounding box for the object within the image frame, based on the bounding box data and the class label data. The processor instructions further cause the processor to determine each of a second value for each pixel in a second set of pixels associated with a class label for the object within the image frame, based on the class label data. The processor instructions further cause the processor to modify each of values for each of the first set of pixels based on the associated first value to render the bounding box on the image frame. The processor instructions further cause the processor to modify each of values for each of the second set of pixels based on the associated second value to render the class label on the image frame.

In yet another embodiment, a non-transitory computer-readable storage medium is disclosed. The non-transitory computer-readable storage medium has instructions stored thereon, a set of computer-executable instructions causing a computer comprising one or more processors to perform steps comprising receiving an object detection information for an image frame within the plurality of image frames, wherein the image frame comprises plurality of objects and the object detection information comprises plurality of bounding boxes data and plurality of class labels data associated with the objects; determining each of a first value for each pixel in a first set of pixels associated with a bounding box for the object within the image frame, based on the bounding box data and the class label data; determining each of a second value for each pixel in a second set of pixels associated with a class label for the object within the image frame, based on the class label data; modifying each of values for each of the first set of pixels based on the associated first value to render the bounding box on the image frame; modifying each of values for each of the second set of pixels based on the associated second value to render the class label on the image frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
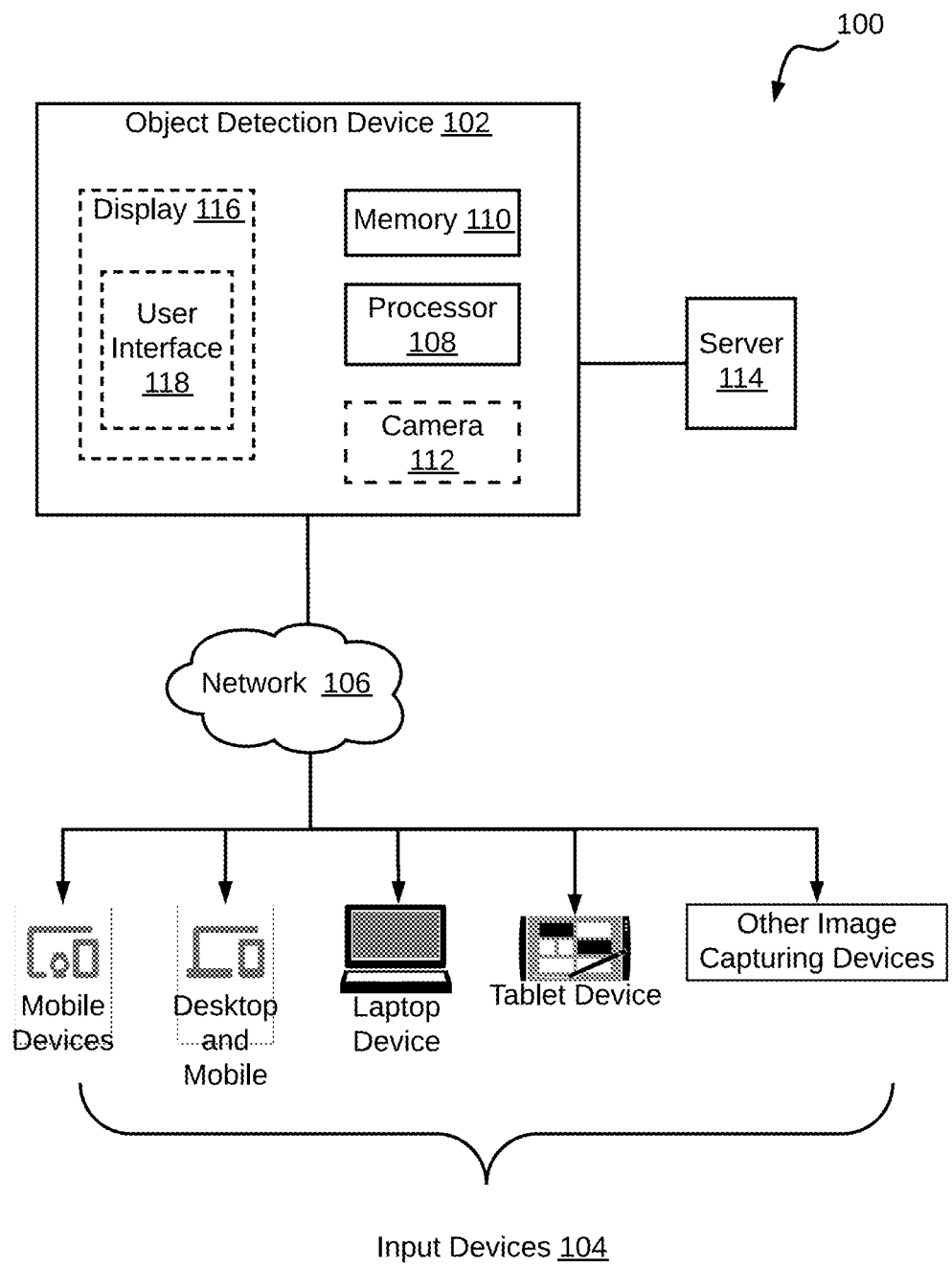
FIG. 1 is a block diagram of a system for rendering object detection graphics on image frames, in accordance with an embodiment.

In one embodiment, a system 100 for rendering object detection graphics on image frames is illustrated in the FIG. 1. The system 100 may include an object detection device 102 that has the processing capabilities for generating and rendering object detection graphics on a plurality of image frames in order to detect one or more objects. Examples of the object detection device 102 may include, but are not limited to a server, a desktop, a laptop, a notebook, a netbook, a tablet, a smartphone, a mobile phone, a security camera, or any other image capturing device. The object detection graphics may include bounding boxes and class labels. A bounding box may enclose an object within an image frame, while a class label may indicate the class or the name associated with the object. By way of an example, an image frame may include a bicycle and a dog. In this case, the object detection device 102 may render a first bounding box around the bicycle and a second bounding box around the dog. Additionally, the object detection device 102 may render a class label of "Bicycle" along with the first bounding box and a class label of "Dog" along with the second bounding box.

An image frame may be received by the object detection device 102 from a plurality of input devices 104. Examples of the plurality of input devices 104 may include, but are not limited to a desktop, a laptop, a notebook, a netbook, a tablet, a smartphone, a remote server, a mobile phone, or any other image capturing device. The other image capturing devices, for example, may include dash cameras, CCTV cameras, or web cameras. The plurality of input devices 104 may be communicatively coupled to the object detection device 102, via a network 106. The network 106 may be a wired or a wireless network and the examples may include, but are not limited to the Internet, Wireless Local Area Network (WLAN), Long Term Evolution (LTE), Worldwide Interoperability for Microwave Access (WiMAX), and General Packet Radio Service (GPRS).

As will be described in greater detail in conjunction with FIG. 2 to FIG. 9, in order to render object detection graphics on image frames, the object detection device 102 may include a processor 108, which may be communicatively coupled to a memory 110. The memory 110 may store processor instructions, which when executed by the processor 108 may cause the processor 108 to render object detection graphics on the plurality of image frames. This is further explained in detail in conjunction with FIG. 2 to FIG. 9, The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM).

The object detection device 102 may also include a camera 112, which may be used to capture images. Thus, in addition to the plurality of input devices 104, the object detection device 102 may receive image frames from the camera 112. The object detection device 102 may further extract image frames from a server 114 that may store a plurality of images that need to be processed for object detection.

The object detection device 102 may further include a display 116 that may include a user interface 118. A user or an administrator may interact with the object detection device 102 and vice versa through the display 116. By way of an example, the display 116 may be used to display the input image frames along with the object detection graphics rendered on the input image frames. By way of another example, the user interface 118 may be used by the user to provide inputs to the object detection device 102.

Figure 2:
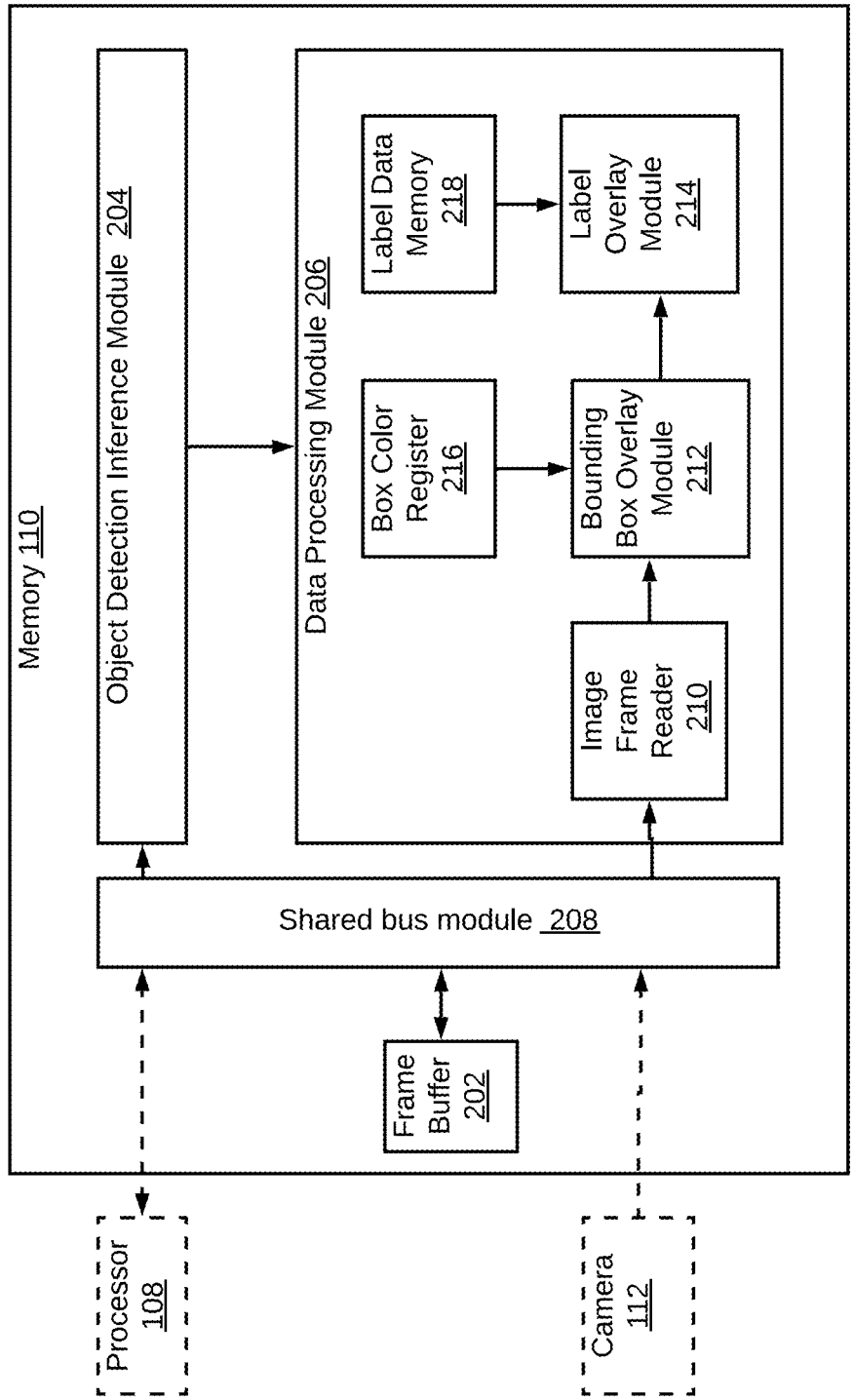
FIG. 2 illustrates a block diagram of a memory of an object detection device configured to render object detection graphics on image frames, in accordance with an embodiment.

Referring now to FIG. 2, a block diagram of a memory 110 of the object detection device 102 configured to render object detection graphics on image frames is illustrated, in accordance with an embodiment. As explained in detail in conjunction with FIG. 1, the object detection graphics include bounding boxes and class labels. The memory 110 may include modules that may perform various functions so as to render object detection graphics on a plurality of image frames. The memory 110 may include a frame buffer 202, an object detection inference module 204, a data processing module 206, and a shared bus module 208. The data processing module 206 may further include an image frame reader 210, a bounding box overlay module 212, a label overlay module 214, a box color register 216, a label data memory 218. As will be appreciated by those skilled in the art, all such aforementioned modules 202-218 may be represented as a single module or a combination of different modules. Moreover, as will be appreciated by those skilled in the art, each of the modules 202-218 may reside, in whole or in parts, on one device or multiple devices in communication with each other.

As a result of the modules 202-218, the object detection device 102 may implement real-time and on-the-fly rendering of bounding boxes and class labels on image frames, thereby eliminating the need to store graphics frame in the frame buffer 202. The frame buffer 202 may store a plurality of image frames. The pixel data associated with each of the plurality of image frames may be in different formats, which may include, but are not limited to Red Grey Blue (RGB), YUV, or YCbCr. The plurality of images may be stored in the frame buffer 202 by the processor 108 and/or the camera 112, via the shared bus module 208. Each of the frame buffer 202, the processor 108, the camera 112 may be communicatively coupled to the shared bus module 208. Additionally, the input devices 104 or the server 114 may also store image frames in the frame buffer 202. The shared bus module 208 may further be communicatively coupled to the image frame reader 210 and the object detection inference module 204.

The object detection inference module 204 may extract an input image frame from the frame buffer 202, via the shared bus module 208. The input image frame may include one or more objects. Examples of the one or more objects may include, but are not limited to animals, vehicles, furniture, or any other identifiable entity. The object detection inference module 204 may identify an object within the input image frame. The object detection inference module 204 may then determine coordinates for a bounding box to be rendered around the object. The object detection inference module 204 may additionally determine a class label to be rendered along with the bounding box. By way of an example, the object may correspond to any material thing that can be seen or touched. Further, the class label may correspond to a name associated with the identified object. In this case, if the identified object is a chair then associated class label will be "Chair," which will be rendered along with a bounding box around the chair.

The object detection inference module 204 may share the bounding box data and the class label data for the class label as object detection information for the image frame. The bounding box data may include, but is not limited to coordinates of the bounding box, one or more default bounding-box attributes, and one or more user defined bounding-box attributes. Similarly, the class label data may include, but is not limited to a class number associated with the object, coordinates of the class label relative to the bounding box, one or more default label attributes, and one or more user defined label attributes. It will be apparent to a person skilled in the art that when the image frame includes multiple objects, the object detection inference module 204 may share the object detection information for each of the multiple objects.

The object detection information shared by the object detection inference module 204 for the object in the image frame may be received by one or more of the bounding box overlay module 212, the label overlay module 214, the box color register 216, and the label data memory 218. In an embodiment, the bounding box overlay module 212 and the label overlay module 214 may only receive the bounding box data identified for the object. Similarly, the box color register 216 and the label data memory 218 may only receive the class label data identified for the object. The functionality of the box color register 216 and the label data memory 218 is explained in detail in conjunction with FIG. 3 and FIG. 5 respectively.

The image frame reader 210 may also extract the image frame from the frame buffer 202 via the shared bus module 208. The image frame reader 210 may then send data associated with the image frame to the bounding box overlay module 212. The data may include image pixel data for the image frame. The image pixel data may be in various formats, which may include, but are not limited to RGB, YUV, or YCbCr.

After receiving the object detection information for the object and the data associated with the image frame, the bounding box overlay module 212 determines a first value for each pixel in a first set of pixels associated with the bounding box for the object within the image frame. The first value for each pixel in the first set of pixels may be determined based on the bounding box data and the class label data. The bounding box overlay module 212 may also receive box color data from the box color register 216. The box color data may be in one or more formats that may include, but are not limited to RGB, YUV, or YCbCr.

The bounding box overlay module 212 may then modify values for each of the first set of pixels based on the associated first value and may render the bounding box on the image frame. The modified values of the first set of pixels may be in one or more formats that may include one or more of but not limited to RGB, YUV, or YCbCr. By way of the rendered bounding box, the bounding box overlay module 212 may share the modified values for each of the first set of pixels with the label overlay module 214. The functionality of the bounding box overlay module 212 is further explained in detail in conjunction with FIG. 3. In an embodiment, the bounding box overlay module 212 may also receive one or more user defined bounding box attributes, which may include, but are not limited to, width of the bounding box, transparency associated with the bounding box, and color of the bounding box.

In a similar manner, after receiving the object detection information for the object, the label overlay module 214 determines a second value for each pixel in a second set of pixels associated with the class label for the object within the image frame. The second value for each pixel in the second set of pixels may be determined based on the bounding box data and the class label data. The label overlay module 214 may also receive label data from the label data memory 218. The label data may be in one or more formats that may include, but are not limited to RGB, YUV, or YCbCr. Examples of label data may include bit map data or pixel data of the text label. The label overlay module 214 may then modify values for each of the second set of pixels based on the associated second value to render the class label on the image frame. The label overlay module 214 may then render the class label at a predetermined position of the bounding box over the object on the image frame. In one example, each detection bounding box may include an associated class number based on which a corresponding class label may be derived and rendered on corresponding bounding box on the image frame. The functionality of the label overlay module 214 is further explained in detail in conjunction with FIG. 5. In an embodiment, the label overlay module 214 may also receive one or more user defined label attributes, which may include, but are not limited to, at least one of a class name associated with the class label, size of the class label, placement of the class label relative to the bounding box, and transparency associated with the class label.

It will be apparent to a person skilled in the art that the image frame may include a plurality of objects. Thus, a plurality of bounding boxes and a corresponding plurality of class labels may be identified and rendered on the image frame. It will be further apparent to a person skilled in the art that multiple such image frames may be processed to render bounding boxes and class labels.

Figure 3:
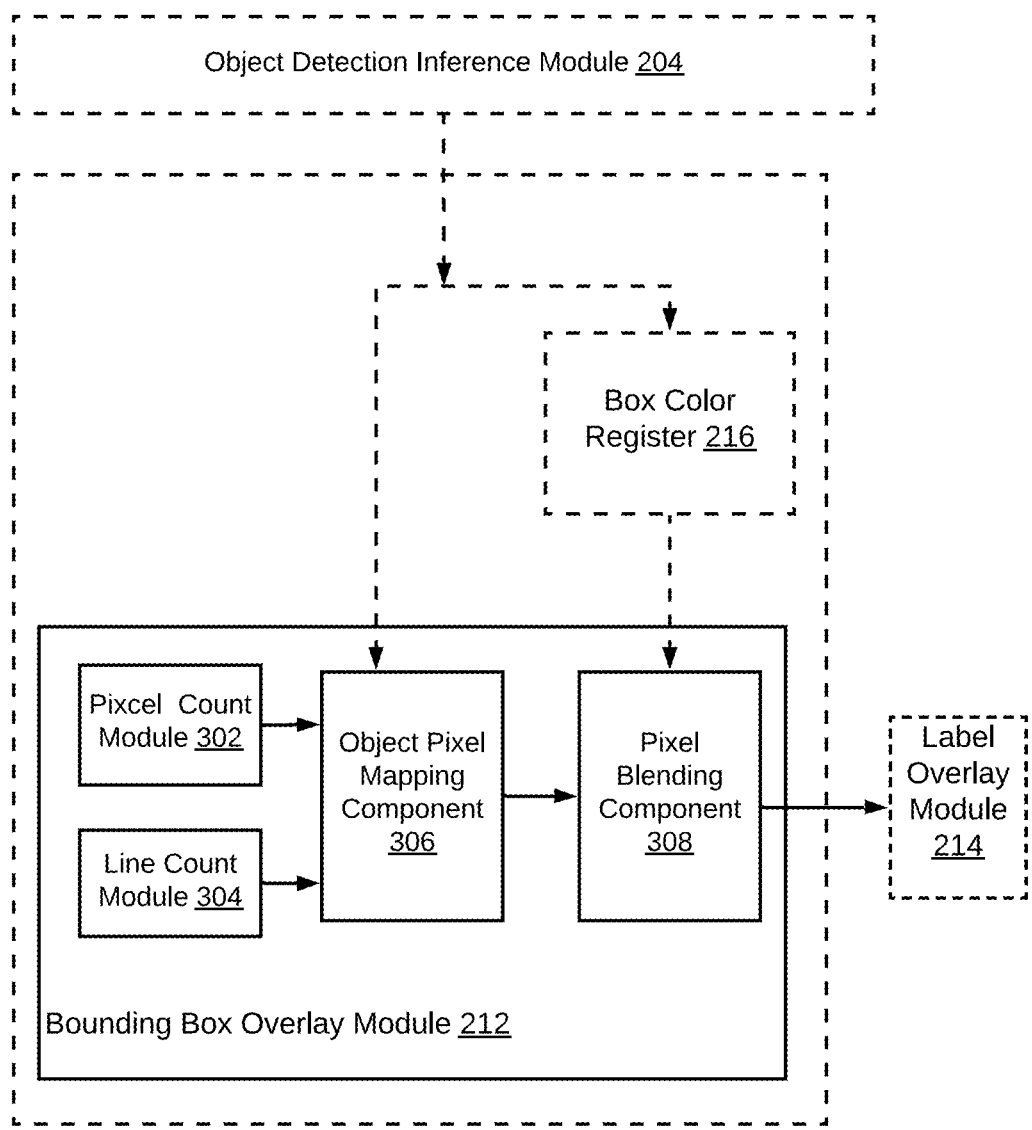
FIG. 3 illustrates a block diagram of bounding box overlay module configured to determine bounding boxes for detected object on a plurality of image frames, in accordance with an embodiment.

Referring now to FIG. 3, a block diagram of the bounding box overlay module 212 configured to render a bounding box for an object on an image frame is illustrated, in accordance with an embodiment. As discussed above, the bounding box overlay module 212 may receive the object detection information from the object detection inference module 204. The object detection information may include the bounding box data, which may further include coordinates of the bounding box, one or more default bounding-box attributes, and one or more user defined bounding-box attributes. The one or more default bounding-box attributes and the one or more user defined bounding-box attributes may include width of the bounding box, transparency associated with the bounding box. The one or more user defined bounding-box attributes may further include color of the bounding box. Thus, in case the one or more user defined bounding-box attributes have not been provided, the one or more default bounding-box attributes are used to render the bounding box.

The bounding box overlay module 212 may also receive the class label data, which may include a class number associated with the object, coordinates of the class label relative to the bounding box, one or more default label attributes, and one or more user defined label attributes. The one or more default label attributes and the one or more user defined label attributes include one or more of a class name associated with the class label, size of the class label, placement of the class label relative to the bounding box, or transparency associated with the class label.

Based on the bounding box data, the associated class label data, and user inputs (for example, user defined bounding-box attributes and user defined label attributes), the bounding box overlay module 212 may render or draw the bounding box on the image frame enclosing the object. The bounding box, which may be rendered or drawn on the image frame, may additionally have specific width, transparency, and color, which is determined based on the bounding box data.

To this end, the bounding box overlay module 212 may include a pixel count module 302, a line count module 304, an object pixel mapping component 306, and a pixel blending component 308. The object pixel mapping component 306 may receive the coordinates of the bounding box from the object detection inference module 204. Additionally, the object pixel mapping component 306 may receive one or more user defined bounding-box attributes (for example width, color, and transparency associated with the bounding box). Based on this data, the object pixel mapping component 306 may generate a bounding box enable output, which is then shared with the pixel blending component 308. The bounding box enable output may be set to one, when the bounding box is to be rendered, while the bounding box enable output may be set to zero, when the bounding box is not to be rendered.

In order to generate the bounding box enable output, the pixel count module 302 and the line count module 304 provide an input to the object pixel mapping component 306. For a given image frame, the pixel count module 302 starts counting pixels in each line. To this end, the pixel count module 302 starts counting from the first pixel of each line and ends with last pixel of that line. For every new line, the pixel count module 302 restarts. In a similar manner, for each image frame, the line count module 304 starts counting lines in each frame. To this end, the line count module 304 starts counting from the first line of each frame and ends with the last line of each frame. For every new frame, the line count module 304 restarts.

The pixel count module 302 and the line count module 304 respectively provide the current pixel count value and line count value to the object pixel mapping component 306. If the current line count value and the pixel count value matches with coordinates of the bounding box and the width (or edge thickness) of the bounding box, the object pixel mapping component 306 generates the bounding box enable output as one. In case of no match, the object pixel mapping component 306 generates the bounding box enable output as zero.

In an embodiment, based on inputs (discussed above) received from the object detection inference module 204, the pixel count module 302, and the line count module 304, the object pixel mapping component 306, may determine a first value for each pixel in a first set of pixel associated with the bounding box for the object within the image frame. The first value for each pixel, may be determined based on the mapping of the pixel count value and the line count value of each pixel received from the pixel count module 302 and the line count module 304, and coordinates of the bounding box received from the object detection inference module 204.

The object pixel mapping component 306 may then share the first value determined for each pixel in the first set of pixel with the pixel blending component 308. Additionally, the object pixel mapping component 306 may share the current pixel count value as received from the pixel count module 302 and the current line count value as received from the line count module 304 with the pixel blending component 308. The current pixel count value and the current line count value are appropriately delayed before being shared with the pixel blending component 308, in order to match latency introduced by the object pixel mapping component 306.

Additionally, the pixel blending component 308 may also receive box color data from the box color register 216. The output (box color data) of the box color register 216 data output may be controlled based on the class number detected for the object by the object detection inference module 204. By way of an example, when the class number corresponds to an animal, a red color may be the output of the box color register 216. The box color data may be in one or more formats that may include, but are not limited to RGB, YUV, or YCbCr. In an embodiment, the box color register 216 may include a color mapping table, which may be used to derive box color data based on the class label data received from the object detection inference module 204. The color mapping table may include mapping of a plurality of class numbers to a plurality of colors.

The pixel blending component 308 may additionally receive, via the bounding box overlay module 212, the image frame extracted by the image frame reader 210 and alpha user input provided by a user. The alpha user input may be transparency associated with the bounding box, which is part of the one or more user defined bounding box attributes. When the bounding box enable output is zero, the pixel blending component 308 bypasses all other inputs and the pixel output from the pixel blending component 308 may be the same as the pixel value of image frame received from the image frame reader 210. However, when the bounding box enable output is one, the pixel blending component 308 may modify the value of each pixel in the first set of pixel by performing alpha-blending and may therefore render the bounding box for the object on the image frame. The alpha-blending performed for modifying the values of each pixel in the first set of pixel may be based on the first value determined for each pixel in the first set of pixel, box color data received, and alpha user input.

Apart from pixel output (modified pixel value for each of the first set of pixels), the pixel blending component 308 may also output the current pixel count value of the pixel count module 302 and the current line count value of the line count module 304 by appropriately delaying these values to compensate for latency introduced by the pixel blending component 308. The output from the pixel blending component 308 are received as input by the label overlay module 214, which is further explained in detail in conjunction with FIG. 5.

Figure 4:
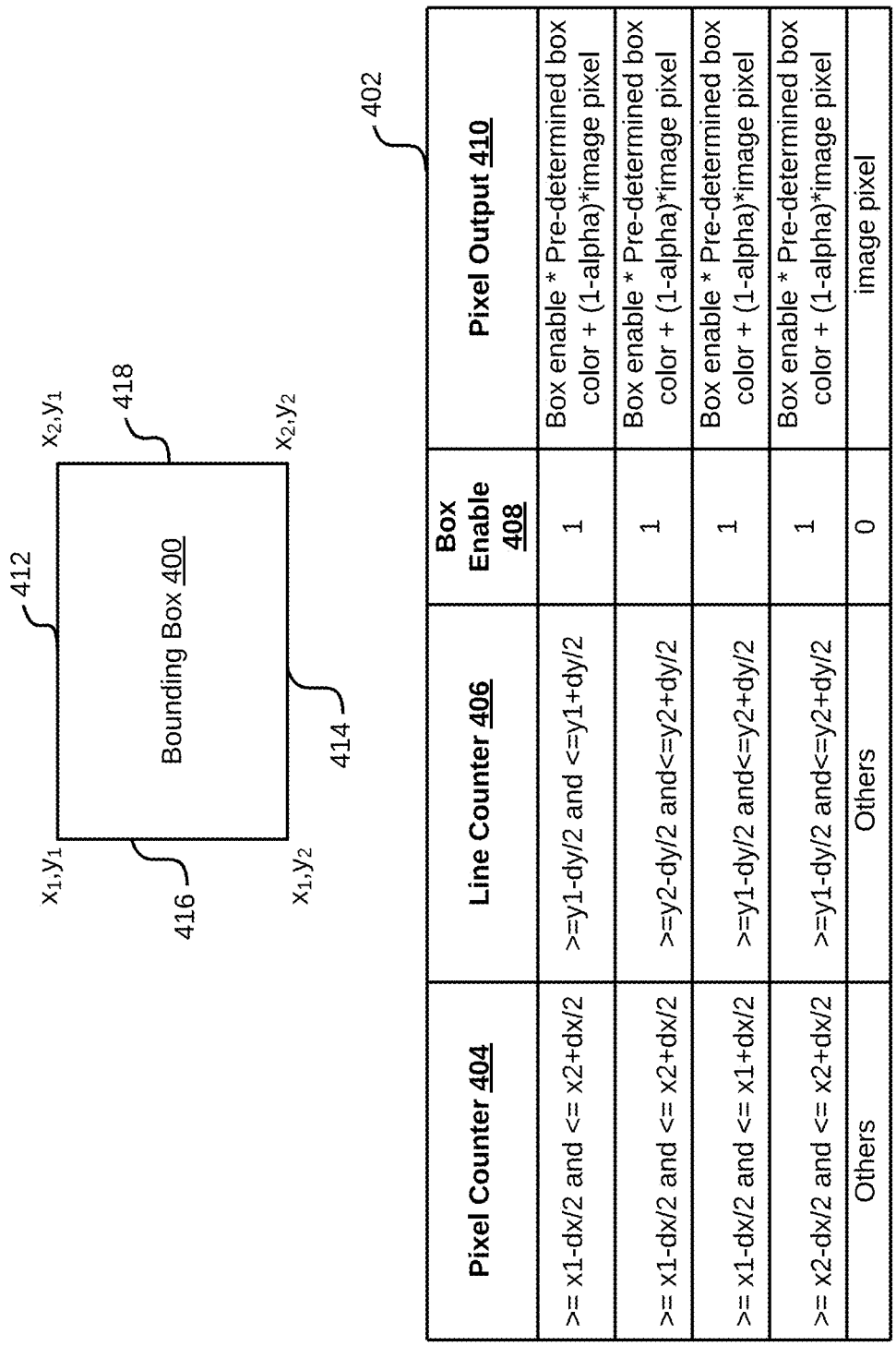
FIG. 4 illustrates a bounding box that is required to be rendered and a table depicting a method for rendering pixel values determined for the bounding box, in accordance with an exemplary embodiment.

Referring now to FIG. 4, a bounding box 400 that is required to be rendered and a table 402 depicting a method for rendering pixel values determined for the bounding box 400 is illustrated, in accordance with an exemplary embodiment. The coordinates of the corners of the bounding box 400 as received from the object detection inference module 204 are (x1, y1), (x2, y1), (x1, y2), and (x2, y2). In the coordinates, x represents a pixel number and y represents a line number in an image frame. Thus, width of the bounding box 400 is (x2-x1) pixels and height of the bounding box 400 is (y2-y1) lines.

Based on these coordinate values and other information received by the object pixel mapping component 306 and the pixel blending component 308, the pixel values for the bounding box 400 are determined as depicted in the table 402.

The table 402 includes a pixel counter column 404, a line counter column 406, a box enable column 408, and a pixel output column 410. The pixel counter column 404 corresponds to pixel counter values of horizontal edges of the bounding box, i.e., horizontal edges 412 and 414. In other words, the pixel counter column 404 includes a range of pixel counter values, which would be part of the bounding box 400, In the pixel counter column 404, "dx" is width of vertical edges of the bounding box 400, i.e., vertical edges 416 and 418. Further, the line counter column 406 corresponds to line counter values of the vertical edges 416 and 418, In other words, the line counter column 406 includes a range of line counter values, which would be part of the bounding box 400. In the line counter column 406, "dy" is the height of the horizontal edges 412 and 414. The values of "dx" and "dy" may be the same. By way of an example, dx=2 and dy=2 may imply that thickness of the vertical edges 416 and 418 may be two pixels and thickness of the horizontal edges 412 and 414 may be two lines.

The box enable column 408 includes a box enable output of the object pixel mapping component 306. As described above, when the box enable output is one, pixel values corresponding to the bounding box 400 in an incoming image frame are modified to render the bounding box 400. In contrast, when the box enable output is zero, pixel values of the incoming image frame are retained. Finally, the pixel output column 410 includes modified value of pixels associated with the bounding box 400.

Referring to the first row of the table 402, the pixel counter column 404 include the equation 1 and the line counter column 406 includes the equation 2, which are given below:

$$>= x1-dx/2 \text{ and } <= x2+dx/2 \quad (1)$$

$$>= y1-dy/2 \text{ and } <= y1+dy/2 \quad (2)$$

For the first row, the box enable column 408 includes the box enable output as one. Thus, reading the equations 1 and 2 in conjunction with the box enable output of one, each image pixel, for which, the pixel counter value conforms with the equation 1 and the line counter value conforms with the equation 2, is modified based on an equation 3 given in the pixel output column 410. In other words, each such image pixel is a part of the bounding box 400. The equation 3 is given below:

$$\text{Box enable*Pre-determined box color+(1-alpha)} \\ \text{*image pixel} \quad (3)$$

Thus, based on the equations 1, 2, and 3, modified values of pixels, which will render the horizontal edge 412 of the bounding box 500, may be determined. In a similar manner, the second row of the table 402 may enable determining modified values of pixels that will render the horizontal edge 414, the third row of the table 402 may enable determining modified values of pixels that will render the vertical edge 416, and the fourth row of the table 402 may enable determining modified values of pixels that will render the vertical edge 418. Thus, the bounding box 400 may be drawn on the image frame, on-the-fly per-pixel basis. The fifth row of the table 402 depicts that, for any image pixel, which does not conform to equations given in the first four rows and the first two columns of the table 402, the box enable output may be zero. In other words, values for such image pixel may not be modified, thereby, retaining the original pixels of the image frame.

Further, when the value of alpha=1, the specific edge of the bounding box 400 may be rendered (in a predetermined color) on the image frame, such that, the edge of the bounding box 400 is opaque and hides the portion of the image frame covered by the bounding box 400. With variation of value of alpha between 0 and 1, the transparency level of various edges of the bounding box 400 may be controlled.

Figure 5:
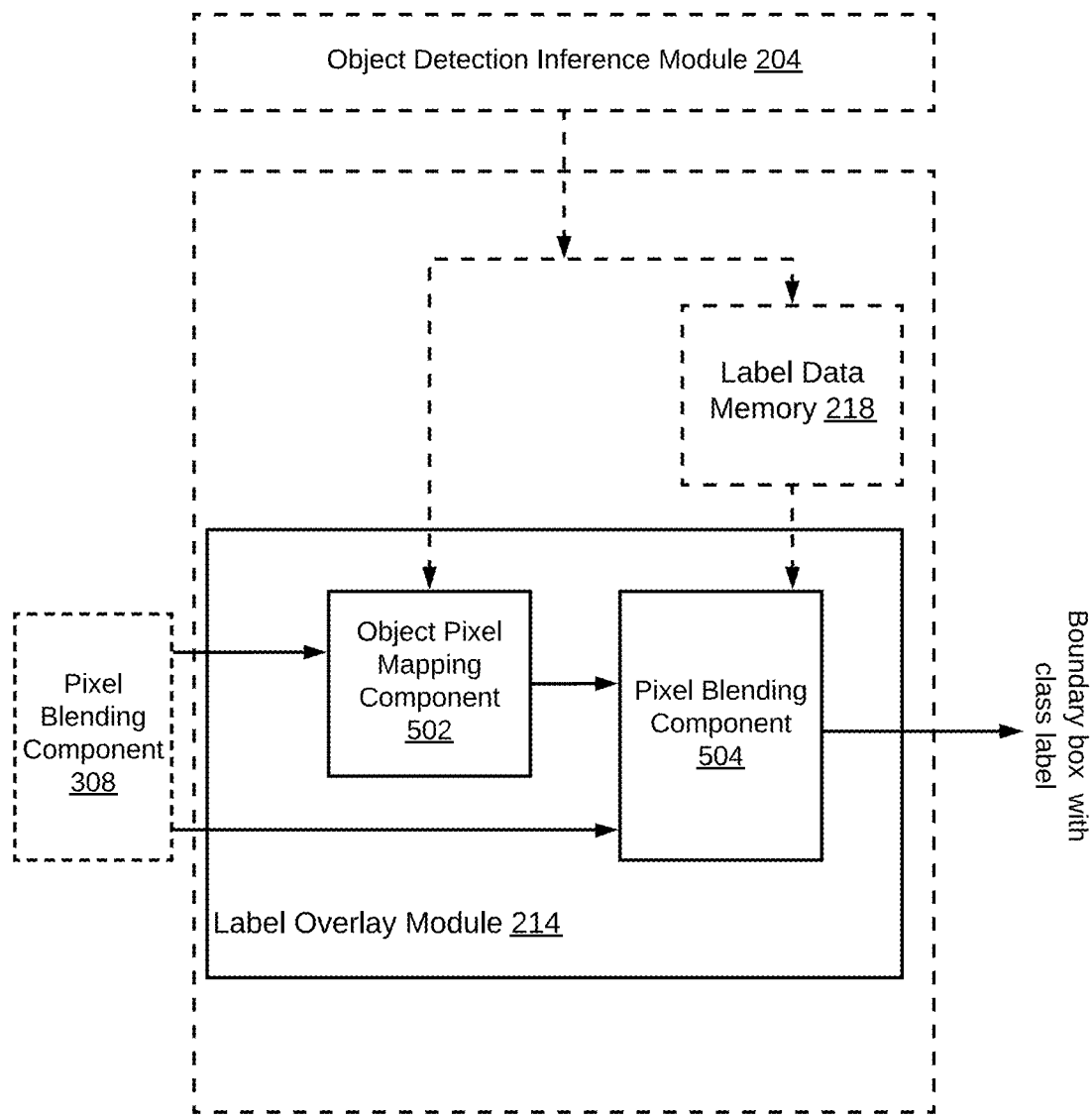
FIG. 5 illustrates a block diagram of label overlay module configured to determine class label for detected object on a plurality of image frames, in accordance with an embodiment.

Referring now to FIG. 5, a block diagram of the label overlay module 214 configured to determine a class label for a detected object on an image frame is illustrated, in accordance with an embodiment. The label overlay module 214 may include an object pixel mapping component 502 and a pixel blending component 504. Referring back to FIG. 2, the label overlay module 214 may receive the object detection information from the object detection inference module 204. The object detection information may include the bounding box data, which may further include coordinates of the bounding box, one or more default bounding-box attributes, and one or more user defined bounding-box attributes. The object detection information may further include the class label data, which may include a class number associated with the object, coordinates of the class label relative to the bounding box, one or more default label attributes, and one or more user defined label attributes. This has been explained in detail in conjunction with FIG. 4. Based on the object detection information thus received, the label overlay module 214 may render the class label at a pre-determined position relative to the bounding box on the image frame. In one example, the pre-determined position at which the class label is rendered on a target bounding box may be automatically determined based on the edge thickness of the target bounding box and presence of overlapping bounding boxes around the target bounding box. In another example, the pre-determined position at which the class label is rendered on a target bounding box may be manually input by the user.

Additionally, referring back to FIG. 3, the object pixel mapping component 502 may receive the current pixel count value of the pixel count module 302 and the current line count value of the line count module 304 from the pixel blending component 308. The object pixel mapping component 502 may also receive coordinates of the bounding box from the object detection inference module 204 and the one or more user defined label attributes from a user. Further, the pixel blending component 504 may receive pixel output for rendering the bounding box, i.e., modified pixel value for each of the first set of pixels, from the pixel blending component 308.

Based on the inputs (discussed above) received from the object detection inference module 204, the pixel count module 302, and the line count module 304, the object pixel mapping component 502 may determine a second value for a second set of pixel associated with a class label for the object within the image frame. The object pixel mapping component 502 may determine the second value for each pixel, based on mapping of the value of each pixel received from the pixel count module 302 and the line count module 304, and coordinates of the class label relative to the bounding box as received from the object detection inference module 204. The object pixel mapping component 502 may then share the second value determined for each pixel in the second set of pixels with the pixel blending component 504.

In an embodiment, the object pixel mapping component 502 first determines coordinates of the class label. Coordinates of the class label are a function of the coordinates of the bounding box, size or dimension of the class label, placement of the class label relative to the bounding box, or transparency associated with the class label. As described earlier, size or dimension of the class label, the placement of the class label relative to the bounding box, or transparency associated with the class label may be a part of one or more user defined label attributes. Alternatively, these may be a part of one or more default label attributes, which may be later modified by the user based on the one or more user defined attributes. This is further explained in detail in conjunction with FIG. 6.

By way of an example, in absence of a user defined attribute or input, the class label may be placed at pre-determined position relative to the bounding box, i.e., on top left edge corner outside the bounding box. Based on an user input, the placement of the class label relative to the bounding box may be modified. By way of another example, edges of the class label may have a predetermined thickness, which is equivalent to that of edges of the bounding box. However, based on a user input, thickness of the edges of the class label may be modified, such that, it is less than or greater than thickness of bounding box edges.

Thereafter, when the pixel count value as received from the pixel count module 302 and the line count value as received from the line count module 304 matches with coordinates determined for the class label, the object pixel mapping component 502 generates the class label enable output as one. In contrast, when the pixel count value as received from the pixel count module 302 and the line count value as received from the line count module 304 do not match with coordinates determined for the class label, the object pixel mapping component 502 generates the class label enable output as zero. The object pixel mapping component 502 shares the class label enable output with the pixel blending component 504.

In addition to the class label enable output, the pixel blending component 504 may also receive data associated with a class name from the label data memory 218. The class name may be in one or more formats that may include, but are not limited to RGB, YUV, or YCbCr. In an embodiment, the label data memory 218 may include a class label mapping table. The class label mapping table includes mapping of a plurality of class numbers to a plurality of class names. The label data memory 218 may receive a class number from the object detection inference module 204. The label data memory 218 may then use the class number as an index to search for associated class name in the class label mapping table.

Based on the inputs received by the pixel blending component 504 as discussed above, the pixel blending component 504 may then modify the value of each pixel in the second set of pixel by performing alpha-blending, and may therefore render the class label for the object on the image frame. It should be noted that, when the class label enable output is zero, the pixel blending component 504 bypasses all other inputs and the pixel output may be the same as the pixel output received from the pixel blending component 308. However, when the class label enable output is one, the pixel blending component 504 may perform the alpha-blending for modifying values of each pixel in the second set of pixel to render the class label on the image frame having a rendered bounding box, based on the second value determined for each pixel in the second set of pixels, the class name, and user defined alpha values. This is further explained in detail in conjunction with FIG. 6.

The label overlay module 214 may then share the image frame that includes rendered bounding box and class label. The image frame that includes the bounding box and the class label may then be displayed to a user. By way of an example, when a dog is identified as an object in an image frame, the image frame provided by the label overlay module 214 may include a bounding box rendered around the dog along with the class label "Dog."

In an embodiment, the bounding box overlay module 212 may not include the pixel blending component 308. In this case, the pixel blending component 504 in the label overlay module 214 may receive pixel output, i.e., modified pixel value for each of the first set of pixels, from the bounding box overlay module 212. In this case, in addition to rendering the class label on the image frame, the pixel blending component 504 may also perform alpha-blending and may therefore render the bounding box for the object on the image frame.

Figure 6:
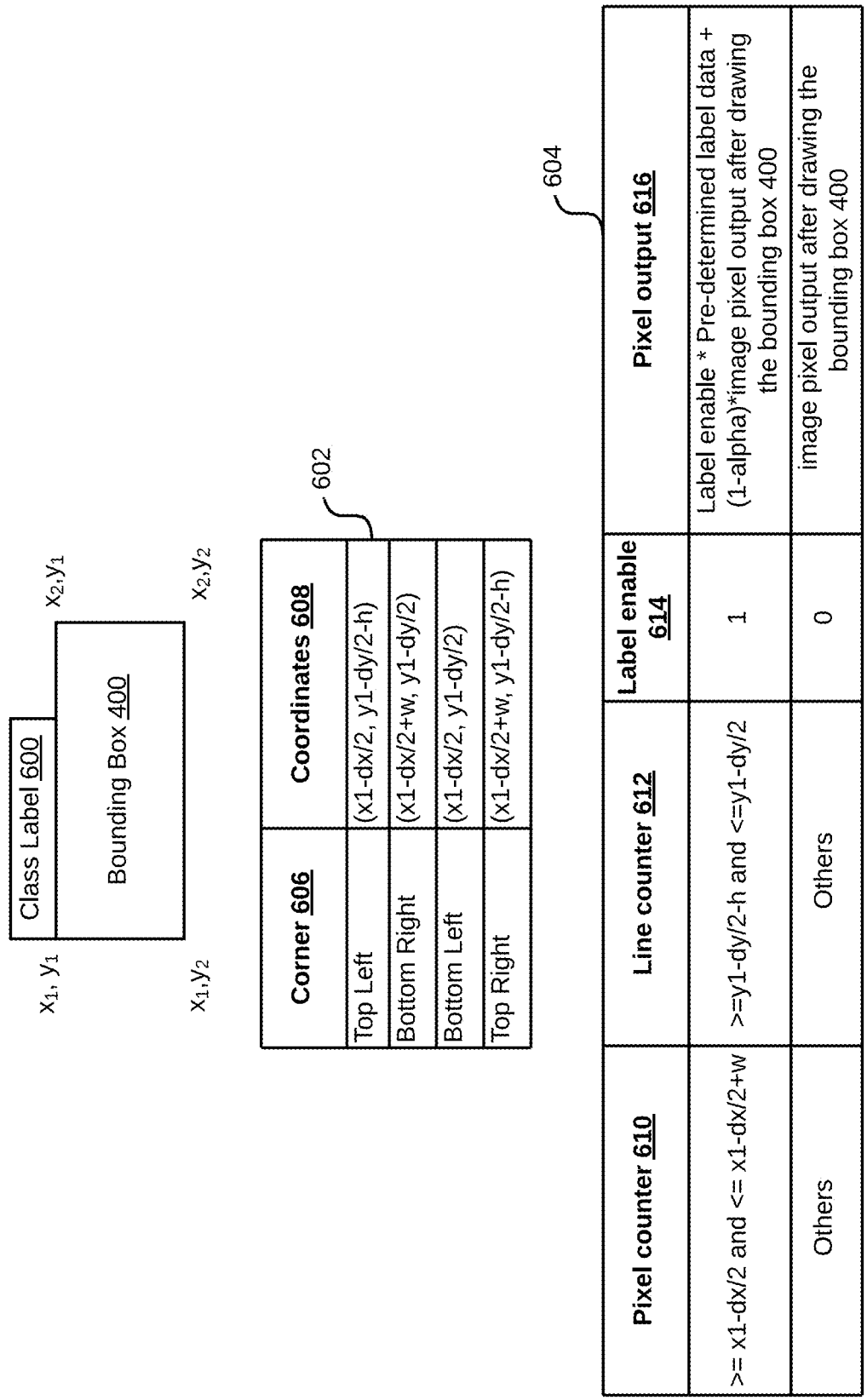
FIG. 6 illustrates a class label that is required to be rendered along with a bounding box, a first table for determining coordinates of the class label, and a second table depicting a method for rendering pixel values determined for the class label, in accordance with an exemplary embodiment.

Referring now to FIG. 6, a class label 600 that is required to be rendered along with the bounding box 400, a table 602 for determining coordinates of the class label 600, and a table 604 depicting a method for rendering pixel values determined for the class label 600 is illustrated, in accordance with an exemplary embodiment. As is apparent from FIG. 6, the class label 600 is to be rendered outside the bounding box 400 and on the top left corner. This may be a pre-determined or default location for the class label. The default location for the class label 600 may be modified based on a user input. In this case, coordinates of the class label 600 may be determined accordingly. In a similar manner, edge thickness of the class label 600 is kept same as that of the bounding box 400, which is the default edge thickness. The user may modify edge thickness of the class label 600. In this case, coordinates of the class label 600 may be determined accordingly.

Referring to the table 602 that includes a corner column 606 and a coordinates column 608. The corner column 606 includes different corners of the class label 600, while the coordinates column 608 includes equations used to determine the respective coordinates. The coordinates of the top left corner and the bottom right corner of the class label 600 may be determined based on equations 4 and 5 respectively:

$$(x1-dx/2, y1-dy/2-h) \quad (4)$$

$$(x1\,dx/2+w, y1-dy/2) \quad (5)$$

In the equations 4 and 5, "w" is the width of the class label 600 in pixels and "h" is height of the class label 600 in lines. In a similar manner, coordinates of the top right corner and the bottom left corner are determined. Based on the coordinate values obtained from the table 602 and other information received by the pixel blending component 504, the pixel values for the class label 600 are determined as depicted in the table 604.

The table 604 includes a pixel counter column 610, a line counter column 612, a label enable column 614, and a pixel output column 616. In the first row of the table 604, the pixel counter column 610 corresponds to a range of pixel counter values for which class label enable output is one (as depicted in the label enable column 614) and the line counter column 612 corresponds to a range of line counter values for which the class label enable output is one. For any other range of pixel counter values and line counter values, the class label enable output is zero (as depicted in the second row of the table 604). In other words, a given pixel, which satisfies the equations given in the first row of the table 602, is part of the class label 600. Also, dimensions or size of the class label 600 may be w*h pixels. When class label enable output in the label enable column 614 is one, the equation 6, given in the pixel output column 616 is executed to modify value of pixels associated with the class label 600. The equation 6 is given below:

Label enable*Pre-determined label data+(1–alpha)
*image pixel output after drawing the bounding
box 400 (6)

Thus, as described above, when the class enable output is one, pixel values corresponding to the class label 600 in an incoming image frame are modified to render the class label 600. Thus, the class label 600 may be drawn on the image frame, on-the-fly, per-pixel basis. In contrast, when the class enable output is zero, pixel values of the incoming image frame from the bounding box overlay module 212 are retained. Further, when the value of alpha=1, only the class label 600 may be visible on the image frame. In other words, the class label 600 is opaque and hides the portion of the image frame covered by the class label 600. With variation of value of alpha between 0 and 1, the transparency level of class label 600 may be controlled.

Figure 7:
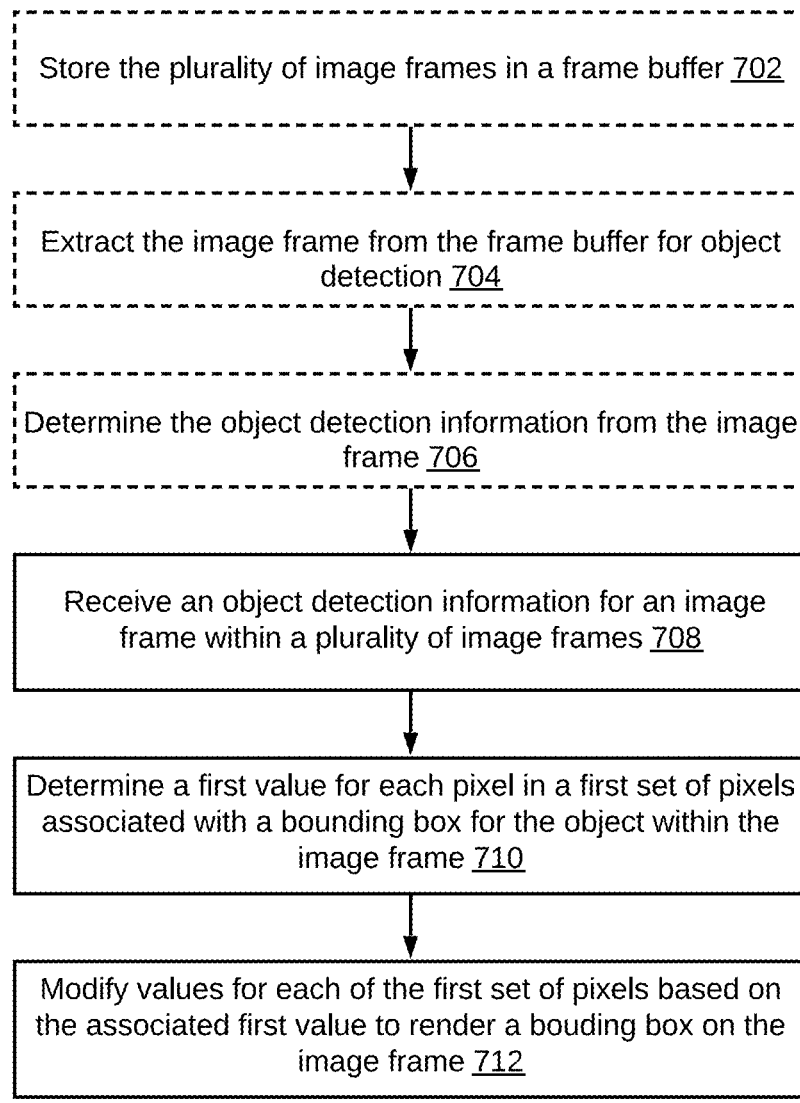
FIG. 7 illustrates a flowchart of a method for determining pixel values for rendering a bounding box on an image frame from a plurality of image frames, in accordance with an embodiment.

Referring now to FIG. 7, a flowchart of a method for determining pixel values for rendering a bounding box on an image frame from a plurality of image frames is illustrated, in accordance with an embodiment. At step 702, the plurality of image frames are stored in a frame buffer (for example, the frame buffer 202). At step 704, the image frame is extracted from the frame buffer for object detection. At step 706, the object detection information is determined from the image frame. The object detection information may include bounding box data and class label data associated with the object. The bounding box data associated with the object may include coordinates of the bounding box, one or more default bounding-box attributes, and one or more user defined bounding-box attributes. Further, each of the default bounding-box attributes and the one or more user defined bounding-box attributes may include width of the bounding box, transparency associated with the bounding box, and color of the bounding box.

At step 708, the object detection information for the image frame is received. The image frame may include an object, thus, the object detection information is associated with the object. It will be apparent to a person skilled in the art that the image frame may include a plurality of objects. Once the object detection information is received for the object on the image frame, a first value is determined, at step 710, for each pixel in a first set of pixels associated with a bounding box for the object, based on the bounding box data and the class label data. At step 712, the value of each pixel in the first set of pixel is modified based on the associated first value as determined at step 710. The value of each pixel in the first set of pixel is modified and may therefore render the bounding box around the object within the image frame.

In an embodiment, modifying the value of each pixel in the first set of pixels may include, identifying a color for the bounding box based on the class label data which may further include a class number for the object and a color mapping table. The color mapping table may include mapping of a plurality of class numbers to a plurality of colors. Thus, the modified values of each of the first set of pixels corresponds to the identified color. This has already been explained in detail in conjunction with FIG. 2 to FIG. 6. In addition to rendering the bounding box around the object in the image frame, a class label may also be rendered on the image frame. This is further explained in detail in conjunction with FIG. 8.

Figure 8:
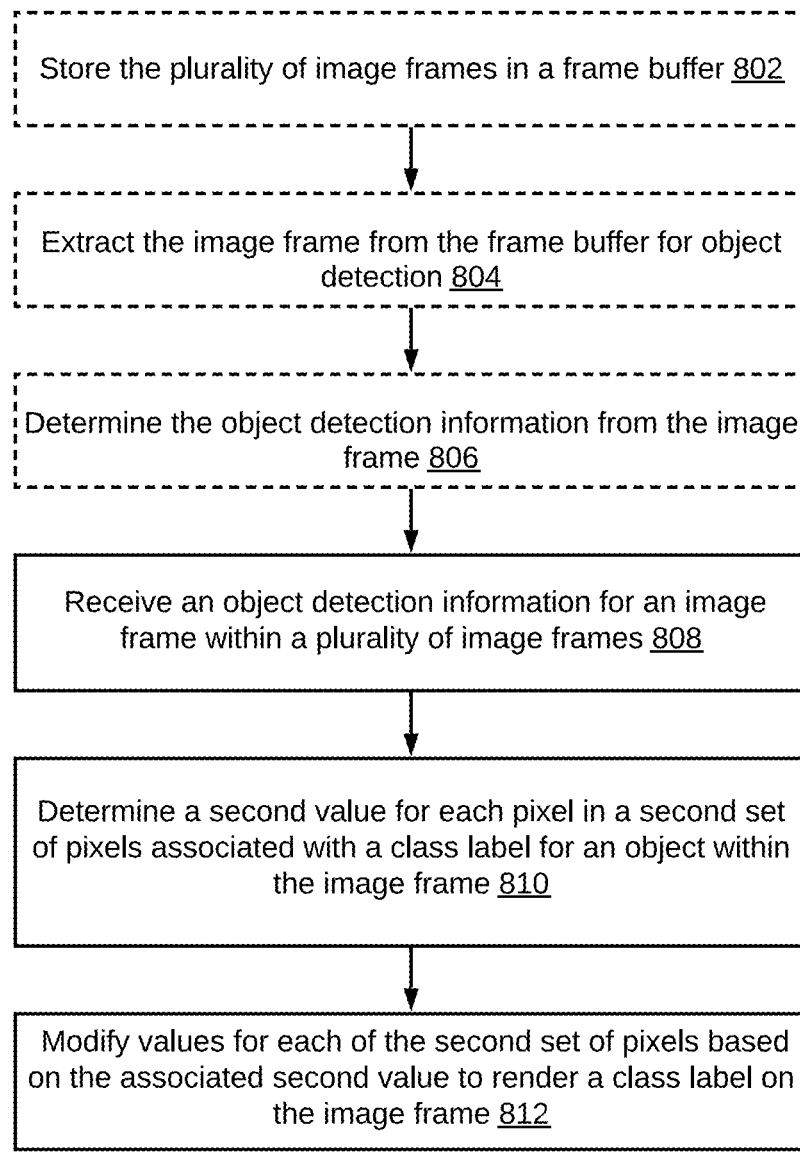
FIG. 8 illustrate a flowchart of a method for determining the pixel values for rendering a class label on an image frame from a plurality of image frames, in accordance with an embodiment.

Referring now to FIG. 8, a flowchart of a method for determining pixel values for rendering a class label on an image frame from a plurality of image frames is illustrated, in accordance with an embodiment. At step 802, the plurality of image frames are stored in a frame buffer (for example, the frame buffer 202). At step 804, the image frame is extracted from the frame buffer for object detection. At step 806, the object detection information is determined from the image frame. The object detection information may include bounding box data and class label data associated with the object. The class label data associated with the object may include a class number associated with the object, coordinates of the class label relative to a bounding box, one or more default label attributes, and one or more user defined label attributes. Further, the one or more default class label attributes and the one or more user defined class label attributes may include a class name associated with the class label, size or dimensions of the class label, placement of the class label relative to the bounding box, and transparency associated with the class label.

At step 808, the object detection information is received. The image frame may include an object, thus, the object detection information is associated with the object. It will be apparent to a person skilled in the art that the image frame may include a plurality of objects and in such case, the object detection information may be associated with the plurality of objects. Once the object detection information is received for the object, at step 810, a second value is determined for each pixel in a second set of pixels for the object, based on the bounding box data and the class label data associated with the object. At step 812, the value of each pixel in the second set of pixels may be modified based on the associated second value determined at step 810. The value of each pixel in the second set of pixels is modified in order to render the class label relative to the bounding box associated with the object. This has already been explained in detail in conjunction with FIG. 2 to FIG. 6. The value of each pixel in the second set of pixels may be modified using a class label mapping table. This is further explained in detail in conjunction with FIG. 9.

Figure 9:
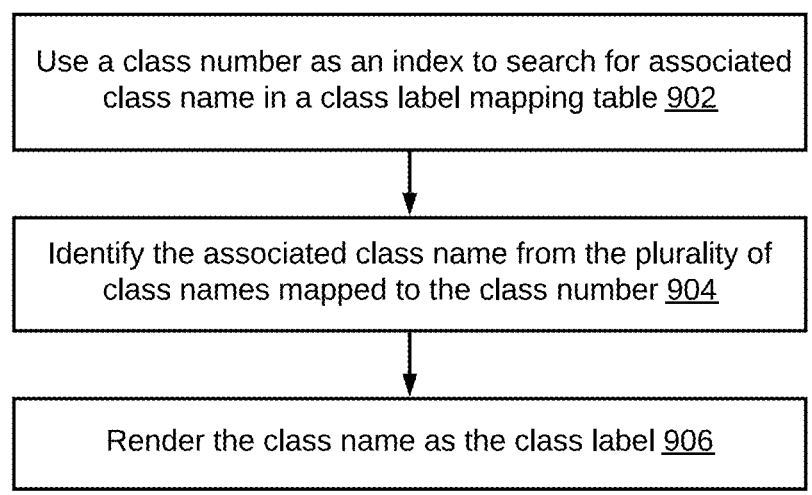
FIG. 9 illustrates a flowchart of a method for modifying values for each of a second set of pixels to render a class label for an object on image frame, in accordance with an embodiment.

Referring now to FIG. 9, a flowchart of a method for modifying values for each of a second set of pixels to render a class label for an object on image frame is illustrated, in accordance with an embodiment. The one or more default class label attributes include a class name associated with the class label. At step 902, the class number is used as an index to search for associated class name in a class label mapping table. The class label mapping table includes mapping of a plurality of class numbers to a plurality of class names. In response to using the class number as the index, the associated class name is identified, at step 904, from the plurality of class names mapped to the class number. At step 906, the class name is rendered as the class label. This has been explained in detail in conjunction with FIG. 5.

Figure 10:
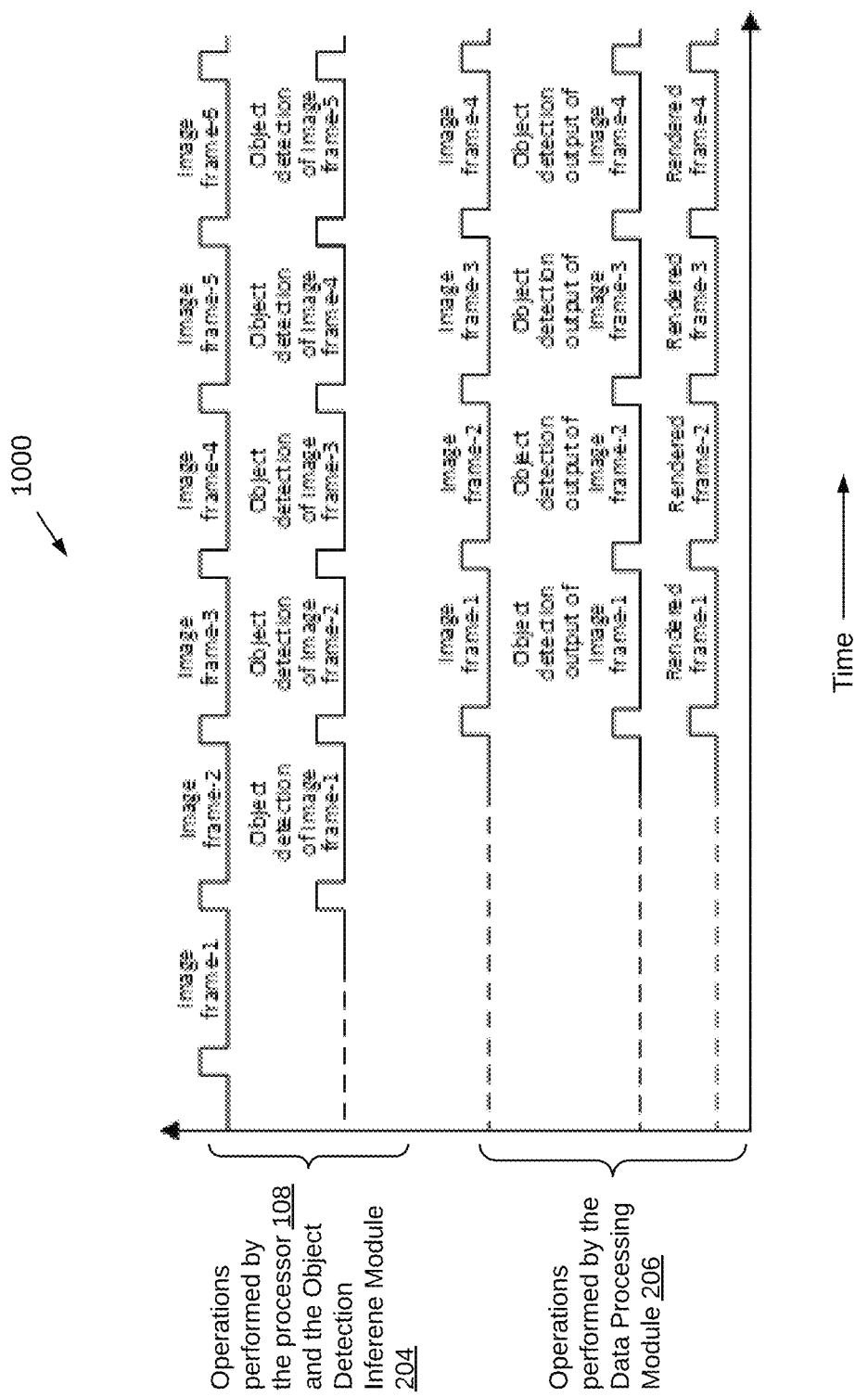
FIG. 10 illustrates a graphial representation depicting the time taken by an object detection device from capturing an image frame to rendering a display image frame, in accordance with an exemplary embodiment.

Referring now to FIG. 10, a graphial representation 1000 depicting the time taken by the object detection device 102 from capturing an image frame to rendering a display image frame is illustrated, in accordance with an exemplary embodiment. In the graphial representation 1000, overall latency from capturing an image frame to sending a display frame to be rendered on a display may be represented by equation 7 given below:

L=Time taken for (Capturing and storing an image frame from camera to frame buffer+(sending the image frame to the object detection inference module 204)+(object detection by the object detection inference module 204)+(Reading the image frame+overlaying bounding boxes and class labels)     (7)

Based on the equation 7, latency in the method and system described in FIG. 1 to FIG. 9 is significantly lower than that of conventional methods and systems. The object detection device 102 eliminates additional time taken by the conventional methods and systems in formation of graphics frame, writing in, and subsequently reading out from the frame buffer. As a result, the latency between an incoming image frame and a rendered image frame (on a display) is significantly lower as compared to the conventional methods and systems. Thus, the overall performance in terms of the number of image frames that can be processed per second is significantly improved. The latency is reduced, as there is no need of storing and reading graphics frames. Moreover, overall detection performance is improved, as there is no need create graphics frames.

Figure 11:
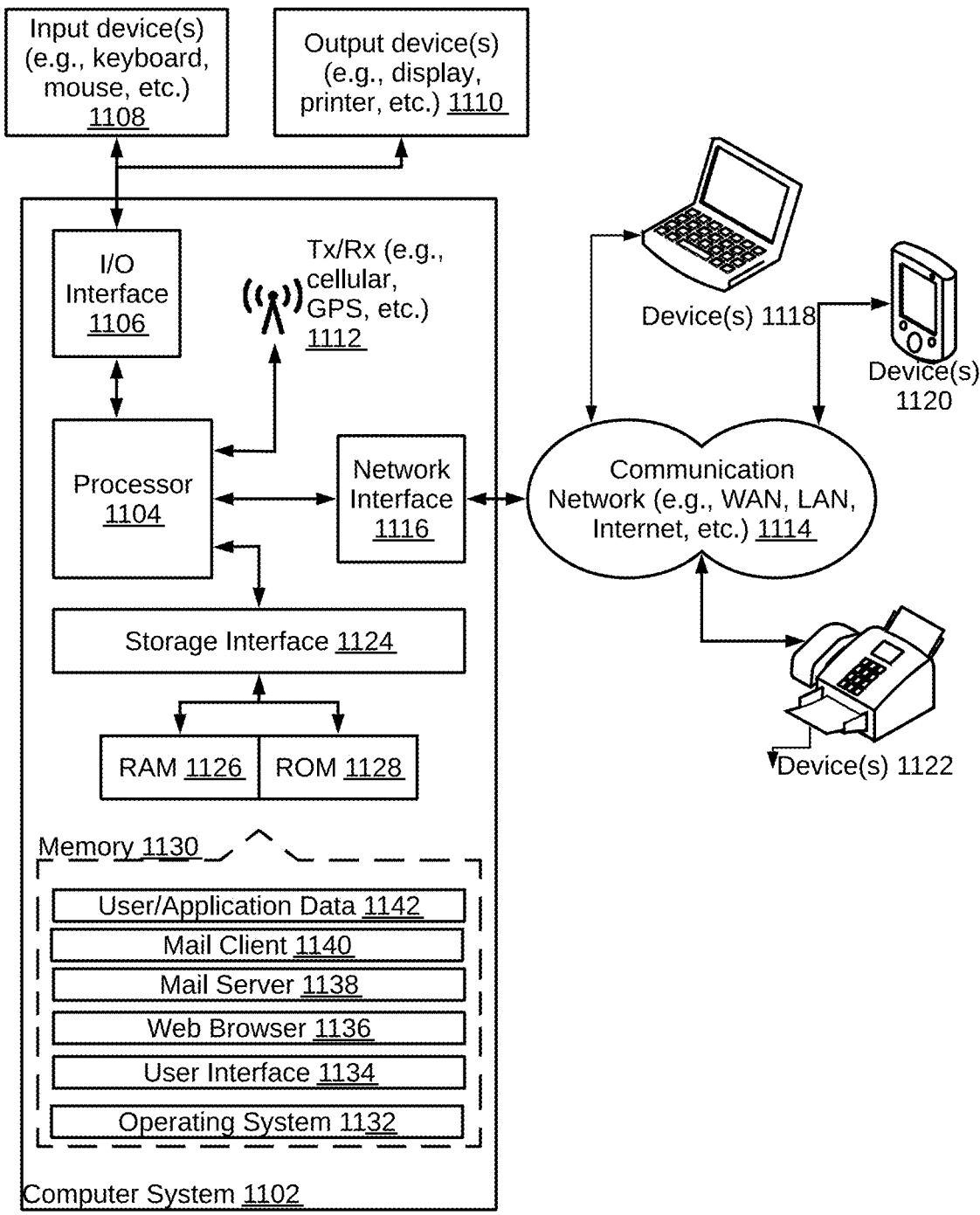
FIG. 11 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 11, a block diagram of an exemplary computer system 1102 for implementing various embodiments is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DUR° N® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACK- BERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® OS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOGGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for rendering object detection graphics on image frames. Conventional methods and systems result in high latency from incoming image frame to rendered frame output to display. This is due to time taken in formation of graphics frame, storing in the frame buffer, and subsequently reading it. This is undesirable in latency sensitive applications such as autonomous vehicles and medical applications etc. Further, this method also reduces overall performance in terms of number of frames that can processed per second.

The proposed method and system, detection bounding boxes along with corresponding class labels are drawn on-the-fly in real time. Hence, the latency from an incoming image frame to a rendered frame output to display is minimal. Further, the proposed method and system also improve overall performance in terms of number of frames that can be processed per second. The proposed method and system may seamlessly scale as per the number of classes and number of object detections supported by the object detection inference module 204. Also, since the proposed system is light weight because of design size perspective and does not rely on any complicated logical/arithmetic operations, the frequency of operation is not a bottleneck and hence the system may be operated at very high frequencies as required in real time applications.

The specification has described method and system for rendering object detection graphics on image frames. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for rendering object detection graphics on a plurality of image frames, the method comprising:
   receiving an object detection information for an image frame within the plurality of image frames, wherein the image frame comprises an object and the object detection information comprises bounding box data and class label data associated with the object,
      wherein the bounding box data associated with the object comprises coordinates and transparency of a target bounding box, and wherein the class label data comprises a class number associated with the object, and coordinates and transparency of a class label relative to the target bounding box;
   calculating a pixel count value and a line count value of each pixel based on counting of pixels and lines in each image frame;
   mapping the pixel count value and the line count value of each pixel with the bounding box data and the class label data;
   generating a bounding box enable output and a class label enable output based on the mapping,
      wherein the bounding box enable output indicates whether the target bounding box is to be rendered or not, and
      wherein the class label enable output indicates whether the class label is to be rendered or not;
   determining each of:
      a first value for each pixel in a first set of pixels associated with the bounding box for the object within the image frame, based on mapping of the pixel count value and the line count value of each pixel in the first set of pixels with coordinates of the bounding box data, and the class label data; and
      a second value for each pixel in a second set of pixels associated with the class label for the object within the image frame, based on mapping of the pixel count value and the line count value of each pixel in the second set of pixels with coordinates of the class label data; and
   modifying each of:
      values for each of the first set of pixels based on the associated first value to render the bounding box on the image frame; and
      values for each of the second set of pixels based on the associated second value to render the class label on the image frame,
   controlling transparency level and width thickness of edges of the target bounding box and the class label to-be-rendered at a pre-determined position on the image frame, based on the modified values for each of the first set of pixels and the second set of pixels, respectively,
      wherein the pre-determined position at which the class label is to-be-rendered on the target bounding box is automatically determined based on edge thickness of the target bounding box and presence of other overlapping bounding boxes around the target bounding box.

2. The method of claim 1, wherein the bounding box data associated with the object further comprises at least one default bounding-box attribute and at least one user defined bounding-box attribute.

3. The method of claim 2, wherein each of the at least one default bounding-box attribute and at least one user defined bounding-box attribute comprises width of the bounding box, and wherein the at least one defined bounding-box attribute further comprises color of the bounding box.

4. The method of claim 3, wherein modifying values for each of the first set of pixels comprises:
   identifying a color for the bounding box based on the class label data that comprises the class number for the object and a color mapping table, wherein the color mapping table comprises mapping of a plurality of class numbers to a plurality of colors, and wherein the modified values of each of the first set of pixels corresponds to the identified color.

5. The method of claim 1, wherein the class label data comprises at least one default label attribute and at least one user defined label attribute.

6. The method of claim 5, wherein each of the at least one default label attribute and at least one user defined label attribute further comprises at least one of a class name associated with the class label, size of the class label, or placement of the class label relative to the bounding box.

7. The method of claim 6, wherein modifying the values for each of the second set of pixels comprises:
   using the class number as an index to search for associated class name in a class label mapping table, wherein the class label mapping table comprises mapping of a plurality of class numbers to a plurality of class names;

identifying the associated class name from the plurality of class names mapped to the class number, in response to using the class number as the index; and rendering the class name as the class label.

8. The method of claim 1, wherein modifying the values for each of the first set of pixels and the second set of pixels comprises performing alpha-blending for the first set of pixels and the second set of pixels.

9. The method of claim 1, further comprising:

storing the plurality of image frames in a frame buffer;

extracting the image frame from the frame buffer for object detection; and determining the object detection information from the image frame.

10. A system for rendering object detection graphics on a plurality of image frames, the system comprising:

a processor; and a memory communicatively coupled to the processor, wherein the memory stores processor instructions, which, on execution, cause the processor to:

receive an object detection information for an image frame within the plurality of image frames, wherein the image frame comprises an object and the object detection information comprises bounding box data and class label data associated with the object, wherein the bounding box data associated with the object comprises coordinates and transparency of a target bounding box, and wherein the class label data comprises a class number associated with the object, and coordinates and transparency of a class label relative to the target bounding box;

calculate a pixel count value and a line count value of each pixel based on counting of pixels and lines in each image frame;

map the pixel count value and the line count value of each pixel with the bounding box data and the class label data;

generate a bounding box enable output and a class label enable output based on the mapping, wherein the bounding box enable output indicates whether the target bounding box is to be rendered or not, and wherein the class label enable output indicates whether the class label is to be rendered or not;

determine each of:

a first value for each pixel in a first set of pixels associated with the bounding box for the object within the image frame, based on mapping of the pixel count value and the line count value of each pixel in the first set of pixels with coordinates of the bounding box data; and a second value for each pixel in a second set of pixels associated with the class label for the object within the image frame, based on mapping of the pixel count value and the line count value of each pixel in the second set of pixels with coordinates of the class label data; and modify each of:

values for each of the first set of pixels based on the associated first value to render the bounding box on the image frame; and values for each of the second set of pixels based on the associated second value to render the class label on the image frame, control transparency level and width thickness of edges of the target bounding box and the class label to-be-rendered at a pre-determined position on the image frame, based on the modified values for each of the first set of pixels and the second set of pixels, respectively, wherein the pre-determined position at which the class label is to-be-rendered on the target bounding box is automatically determined based on edge thickness of the target bounding box and presence of other overlapping bounding boxes around the target bounding box.

11. The system of claim 10, wherein the bounding box data associated with the object further comprises at least one default bounding-box attribute and at least one user defined bounding-box attribute.

12. The system of claim 11, wherein each of the at least one default bounding-box attribute and at least one user defined bounding-box attribute comprises width of the bounding box, and wherein the at least one user defined bounding-box attribute further comprises color of the bounding box.

13. The system of claim 12, wherein to modify values for each of the first set of pixels, the processor instructions further cause the processor to:

identify a color for the bounding box based on the class label data that comprises the class number for the object and a color mapping table, wherein the color mapping table comprises mapping of a plurality of class numbers to a plurality of colors, and wherein the modified values of each of the first set of pixels corresponds to the identified color.

14. The system of claim 10, wherein the class label data comprises at least one default label attribute and at least one user defined label attribute.

15. The system of claim 14, wherein each of the at least one default label attribute and at least one user defined label attribute further comprises at least one of a class name associated with the class label, size of the class label, or placement of the class label relative to the bounding box.

16. The system of claim 15, wherein to modify the values for each of the second set of pixels, the processor instructions further cause the processor to:

use the class number as an index to search for associated class name in a class label mapping table, wherein the class label mapping table comprises mapping of a plurality of class numbers to a plurality of class names;

identify the associated class name from the plurality of class names mapped to the class number, in response to using the class number as the index; and render the class name as the class label.

17. The system of claim 10, wherein to modify the values for each of the first set of pixels and the second set of pixels, the processor instructions further cause the processor to perform alpha-blending for the first set of pixels and the second set of pixels.

18. The system of claim 10, wherein the processor instructions further cause the processor to:

store the plurality of image frames in a frame buffer;

extract the image frame from the frame buffer for object detection; and determine the object detection information from the image frame.

19. A non-transitory computer-readable storage medium comprising a set of computer-executable instructions causing a computer comprising one or more processors to perform steps comprising:

receiving an object detection information for an image frame within the plurality of image frames, wherein the image frame comprises an object and the object detection information comprises bounding box data and class label data associated with the object, wherein the bounding box data associated with the object comprises coordinates and transparency of a target bounding box, and wherein the class label data comprises a class number associated with the object, and coordinates and transparency of a class label relative to the target bounding box;

calculating a pixel count value and a line count value of each pixel based on counting of pixels and lines in each image frame;

mapping the pixel count value and the line count value of each pixel with the bounding box data and the class label data;

generating a bounding box enable output and a class label enable output based on the mapping,
  wherein the bounding box enable output indicates whether the target bounding box is to be rendered or not, and
  wherein the class label enable output indicates whether the class label is to be rendered or not;

determining each of:
  a first value for each pixel in a first set of pixels associated with the bounding box for the object within the image frame, based on mapping of the pixel count value and a line count value of each pixel in the first set of pixels with the bounding box data, and the class label data; and
  a second value for each pixel in a second set of pixels associated with a class label for the object within the image frame, based on mapping of the pixel count value and the line count value of each pixel in the second set of pixels with coordinates of the class label data; and modifying each of:
  values for each of the first set of pixels based on the associated first value to render the bounding box on the image frame; and
  values for each of the second set of pixels based on the associated second value to render the class label on the image frame, controlling transparency level and width thickness of edges of the target bounding box and the class label to-be-rendered at pre-determined position on the image frame, based on the modified values for each of the first set of pixels and the second set of pixels, respectively, wherein the pre-determined position at which the class label is to-be-rendered on the target bounding box is automatically determined based on edge thickness of the target bounding box and presence of other overlapping bounding boxes around the target bounding box.

* * * * *